United States Patent
Preston

(10) Patent No.: US 6,317,914 B1
(45) Date of Patent: Nov. 20, 2001

(54) DOCKLEVELER HOLDOWN MECHANISM AND METHOD FOR INSTALLING THE SAME

(75) Inventor: Bart M. Preston, Conklin, MI (US)

(73) Assignee: Kelley Company, Inc., Mequon, WI (US)

( * ) Notice: Subject to any disclaimer, the term of this patent is extended or adjusted under 35 U.S.C. 154(b) by 0 days.

(21) Appl. No.: 09/401,242

(22) Filed: Sep. 23, 1999

(51) Int. Cl.$^7$ .................................................. E01D 1/00
(52) U.S. Cl. .............................. 14/71.3; 14/71.1; 14/69.5
(58) Field of Search ........................ 404/69.5, 71.1, 404/71.3, 71.5

(56) References Cited

U.S. PATENT DOCUMENTS

| | | | |
|---|---|---|---|
| 3,646,627 | * 3/1972 | Potter | 14/71 |
| 4,257,136 | 3/1981 | Loblock | 14/71.3 |
| 4,376,319 | 3/1983 | Bedord | 14/71.3 |
| 4,398,315 | 8/1983 | Driear et al. | 14/71.3 |
| 4,402,100 | 9/1983 | Slusar | 14/71.3 |
| 4,445,703 | 5/1984 | Fromme et al. | 14/71.3 |
| 4,525,887 | 7/1985 | Erlandsson et al. | 14/71.3 |
| 4,531,248 | 7/1985 | Swessel et al. | 14/71.3 |
| 4,665,579 | 5/1987 | Bennett et al. | 14/71.1 |
| 4,689,846 | 9/1987 | Sherrod | 14/71.3 |
| 4,703,534 | 11/1987 | Pedersen | 14/71.1 |
| 4,823,421 | 4/1989 | Kleynjans et al. | 14/71.3 |
| 4,847,935 | 7/1989 | Alexander et al. | 14/71.3 |
| 4,922,568 | 5/1990 | Hageman | 14/71.3 |
| 4,974,276 | 12/1990 | Alexander | 14/71.3 |
| 5,123,135 | 6/1992 | Cook et al. | 14/71.3 |
| 5,226,509 | * 7/1993 | Smith | 188/1.11 |
| 5,303,443 | 4/1994 | Alexander | 14/71.1 |
| 5,440,772 | * 8/1995 | Springer et al. | 14/69.5 |
| 5,551,113 | 9/1996 | Marler et al. | 14/71.7 |
| 5,586,356 | 12/1996 | Alexander | 14/71.1 |
| 5,647,081 | 7/1997 | Marler et al. | 14/71.7 |
| 5,699,880 | * 12/1997 | Hockley | 188/1.11 |
| 6,064,859 | * 5/1998 | Winter | 14/71.3 |
| 6,112,353 | * 9/2000 | Winter | 14/71.3 |
| 6,135,242 | * 10/2000 | Hockley | 188/1.11 R |

* cited by examiner

*Primary Examiner*—Thomas B. Will
*Assistant Examiner*—Raymond W Addie
(74) *Attorney, Agent, or Firm*—Michael Best & Friedrich LLP

(57) ABSTRACT

A dockleveler comprising a support structure adapted to be mounted to a loading dock, a ramp connected to the support structure and movable between a raised position and a lowered position, a upward biasing mechanism connected to the ramp, and a holdown mechanism connected between the ramp and the support structure. The holdown mechanism includes a spring assembly having an extension spring that increases in length as the ramp moves toward the raised position. The holdown mechanism further includes an adapter member interconnecting the holdown mechanism with at least one of the ramp and the support structure. The adapter member is separable from the holdown mechanism to allow the attachment of different adapter members to the holdown mechanism without cutting or welding. The extension spring is housed within a first hollow member and a second hollow member positioned at least partially within the first hollow member and movable relative to the first hollow member.

9 Claims, 4 Drawing Sheets

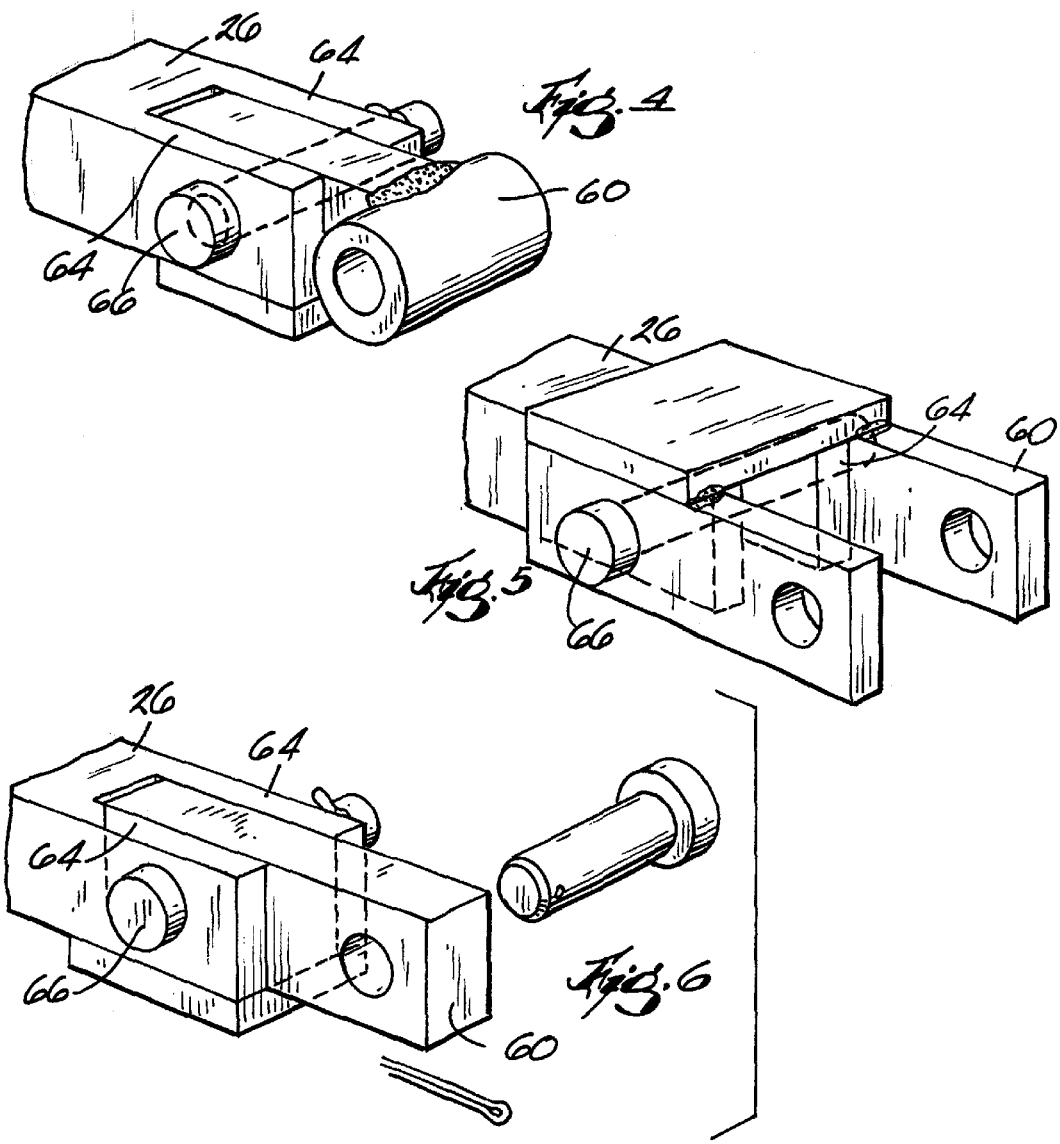
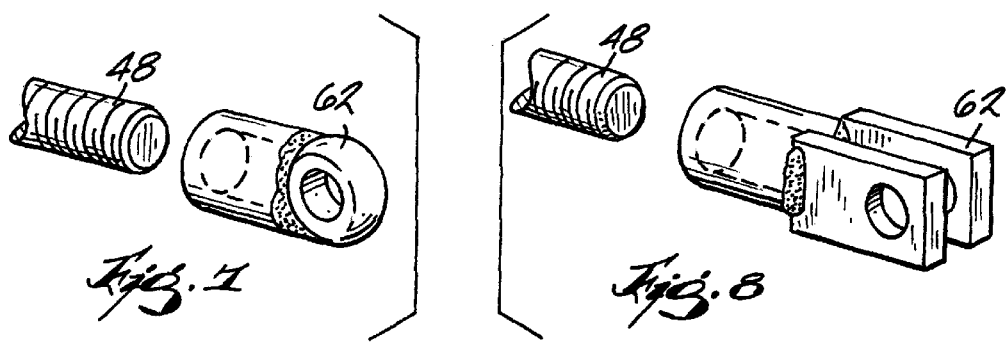

DOCKLEVELER HOLDOWN MECHANISM AND METHOD FOR INSTALLING THE SAME

FIELD OF THE INVENTION

The present invention generally relates to docklevelers, and specifically to holdown mechanisms for upwardly-biased docklevelers.

BACKGROUND OF THE INVENTION

Docklevelers are mounted on loading docks and are adapted to bridge the gap between the dock and the end of a vehicle (e.g., a truck or trailer) parked in front of the dock. The dockleveler enables material handling equipment, such as a fork lift, to move between the dock and the vehicle.

The typical dockleveler includes a support structure, which is mounted in a pit in the loading dock, and a ramp. The rear end of the ramp is pivotally attached to the support structure so that the ramp is movable from a horizontal position to a position within the working range of the ramp (e.g., between an upwardly inclined position and a downwardly declined position). Hinged to the front end of most ramps is an extension lip, which is movable between a downwardly hanging pendent position and an extended position where the lip forms an extension to the ramp. After a truck is parked in front of the loading dock in preparation for a loading operation, the ramp is pivoted upwardly to allow the pendent lip to clear the vehicle bed. As the ramp is moved, the lip is pivoted outwardly from the pendent position to the extended position. As the ramp is lowered, the extended lip will engage the bed of the truck to provide support to the ramp.

Many docklevelers include a biasing mechanism for upwardly-biasing the ramp. For example, some docklevelers include a large spring that biases the ramp toward the inclined position. The biasing force is such that it is only slightly more than is enough to counterbalance the weight of the ramp. In order to lower the ramp into engagement with a vehicle, the user can walk onto the ramp, thereby overcoming the biasing force, and lowering until the lip engages the vehicle.

In order to maintain the lip in contact with the vehicle, some docklevelers are provided with a holdown mechanism connected between the ramp and the support structure. One type of holdown mechanism includes a ratchet bar connected to the ramp and a spring assembly connected to the support structure. The spring assembly includes a compression spring positioned within a hollow cylinder, and a pawl device connected to the cylinder. The pawl device slidably receives the ratchet bar and can selectively engage the ratchet bar to prevent it from moving upwardly away from the pawl device. In this engaged condition, the compression spring will allow some upward movement of the ratchet bar relative to the support structure to thereby accommodate upward float of the vehicle. Such a device is disclosed in U.S. Pat. No. 3,646,627.

One type of holdown mechanism has been designed to accommodate a greater amount of upward float. This design includes a release cable that will release engagement between the pawl and ratchet bar when the compression limit of the compression spring is approached. This design is disclosed in U.S. Pat. No. 4,531,248.

An alternative means for increasing the amount of float that can be accommodated by a holdown mechanism is to increase the length of the compression spring. However, due to space constraints under many ramps (e.g., when the ramp is in the declined position), the extent to which the compression spring can be lengthened is limited.

SUMMARY OF THE INVENTION

The present invention provides a holdown mechanism that has an improved range of operation for a given static length of spring, while allowing the pawl to maintain engagement with the ratchet bar. This improvement is accomplished by utilizing a spring assembly that includes an extension spring as the mechanism for accommodating float.

Preferably, the extension spring is housed within a first housing attached to a first end of the extension spring, and a second housing movable relative to the first housing and attached to a second end of the extension spring. Such a design provides protection to the spring. In addition, the spring assembly includes a preload adjustment to adjust the static tensile load on the spring.

Another feature of the holdown mechanism disclosed herein is that it can be installed on a variety of different styles of docklevelers. This is accomplished by providing the holdown mechanism with adapter members that can be secured to the ends of the holdown mechanism. There are several different styles of adapter members, each of which facilitates connecting the holdown mechanism to a different style of dockleveler. Preferably, the adapter members are separable from the holdown mechanism to allow the attachment of different adapter members without the need for cutting or welding. For example, the adapter members can be pinned or threaded to the holdown mechanism.

By virtue of this design, a single holdown mechanism can be used to service a variety of different style docklevelers. This allows a service technician to stock a single holdown mechanism, instead of a different holdown mechanism for each different dockleveler serviced. In this regard, when a holdown mechanism is to be replaced, the old holdown mechanism is removed from the dockleveler and the type of dockleveler to which the holdown mechanism will be installed is determined. Based on this determination, an adapter member that will fit onto the dockleveler is selected. The adapter member is then connected to the holdown mechanism, and holdown mechanism can then be installed into the dockleveler.

BRIEF DESCRIPTION OF THE DRAWINGS

FIG. 4 is an enlarged perspective of a first adapter member mounted to an end of a ratchet bar.

FIG. 5 is an enlarged perspective of a second adapter member mounted to an end of the ratchet bar.

FIG. 6 is an enlarged perspective of a third adapter member mounted to an end of the ratchet bar.

FIG. 7 is an enlarged perspective of a fourth adapter member mounted to an end of a spring assembly.

FIG. 8 is an enlarged perspective of a fifth adapter member mounted to an end of the spring assembly.

DETAILED DESCRIPTION

Figure 1:
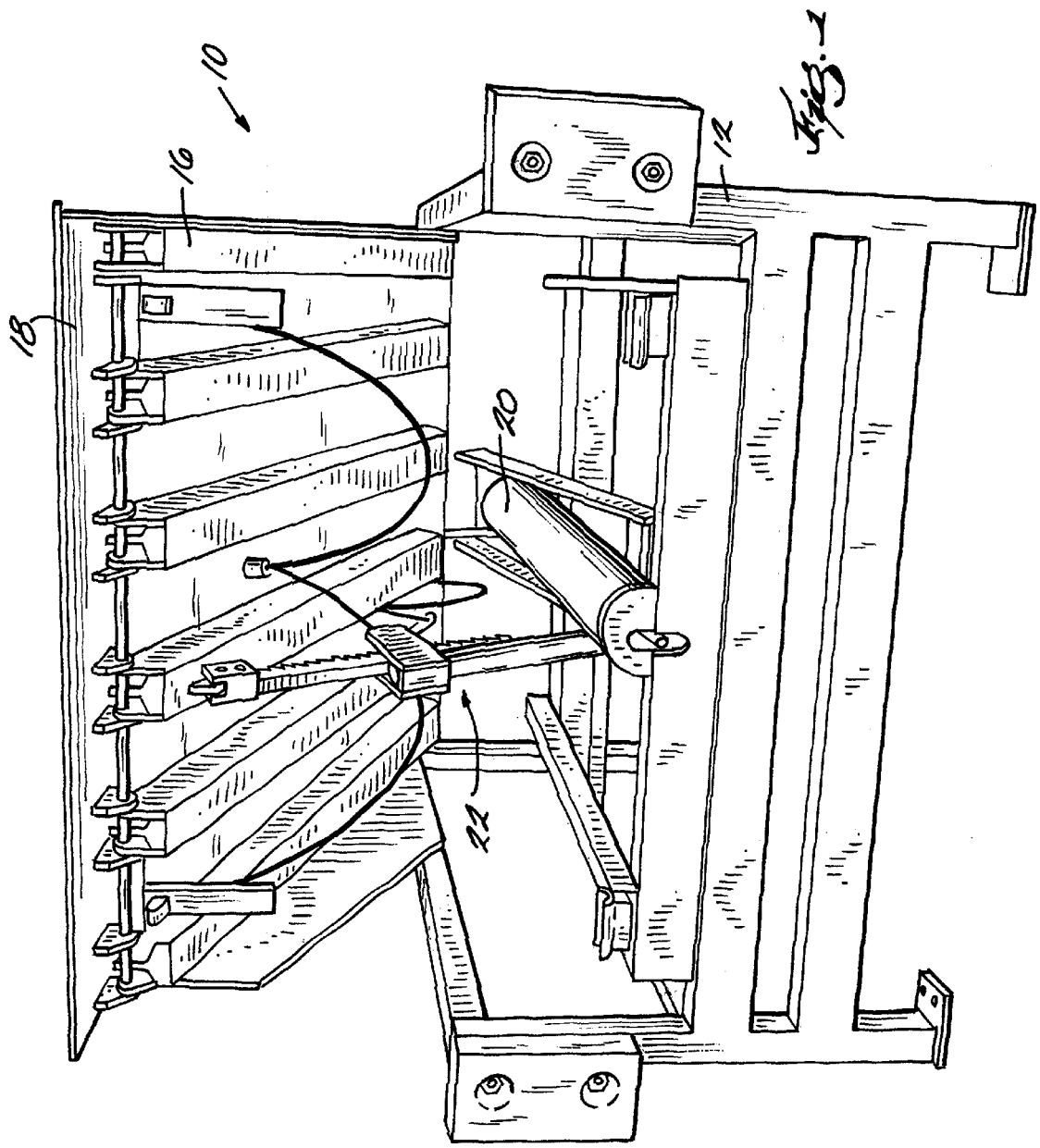
FIG. 1 is a perspective view of a dockleveler, including a holdown mechanism embodying the present invention.
Figure 2:
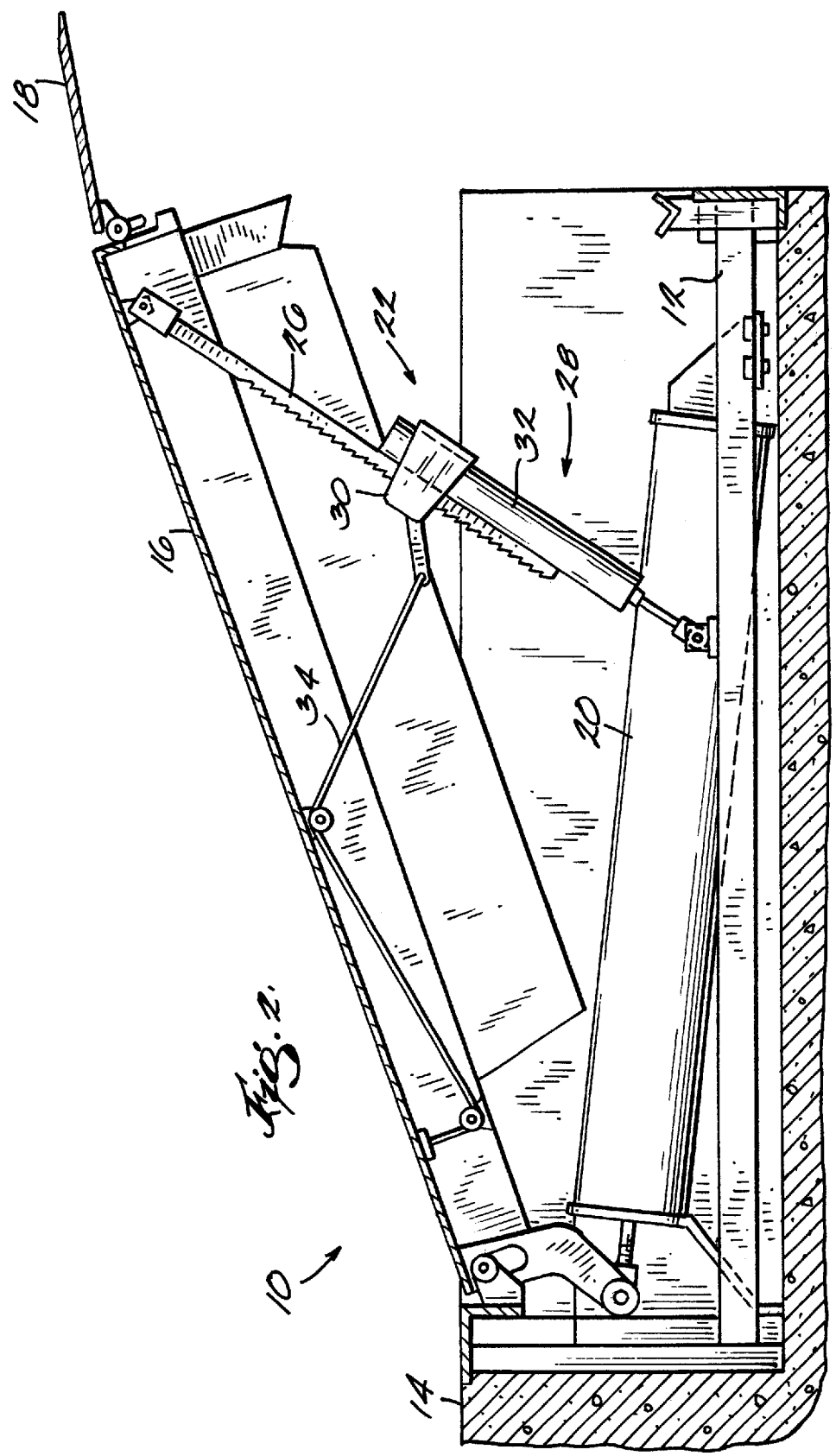
FIG. 2 is a side section view of the dockleveler of FIG. 1.

Referring to FIGS. 1 and 2, the illustrated dockleveler 10 generally includes a support structure 12 adapted to be mounted to a loading dock 14, a ramp 16 pivotally connected to the support structure 12, a lip 18 pivotally connected to the ramp 16, an upward-biasing mechanism 20, and a holdown mechanism 22. The ramp 16 is movable between a raised position (as illustrated in FIGS. 1 and 2) and a lowered position. The upward-biasing mechanism 20 biases the ramp 16 toward the raised position. The illustrated upward-biasing mechanism 20 comprises a coil spring positioned within a cylindrical housing. However, any suitable biasing mechanism would be appropriate, such as a gas spring, leaf spring, etc. The general operation of the ramp 16, lip 18, and biasing mechanism 20 is described in U.S. Pat. Nos. 3,646,627 and 3,997,932.

The illustrated holdown mechanism 22 is connected between the ramp 16 and the support structure 12. In the illustrated embodiment, the support structure 12 that is connected to the holdown mechanism 22 is physically unified with the support structure 12 that supports the ramp 16 (see, e.g., FIG. 2). However, it should be appreciated that these two structures could be physically separate (e.g., each independently secured to the loading dock) without detracting from the present invention. As used herein, the term support structure can refer to either a unified structure or separate structures.

The holdown mechanism 22 includes a first holdown member in the form of a ratchet bar 26 pivotally connected to the ramp 16, and a second holdown member 28 movably connected to the first holdown member. The illustrated second holdown member 28 includes a pawl mechanism 30 attached to a spring assembly 32.

The pawl mechanism 30 is designed to selectively engage the ratchet bar 26 to limit upward movement of the ratchet bar 26 relative to the pawl mechanism 30. The pawl mechanism 30 can be disengaged by manually pulling a release chain 34. The general concepts of the ratchet bar and pawl mechanism are well known in the dockleveler field and are described in U.S. Pat. No. 3,646,627.

Figure 3:
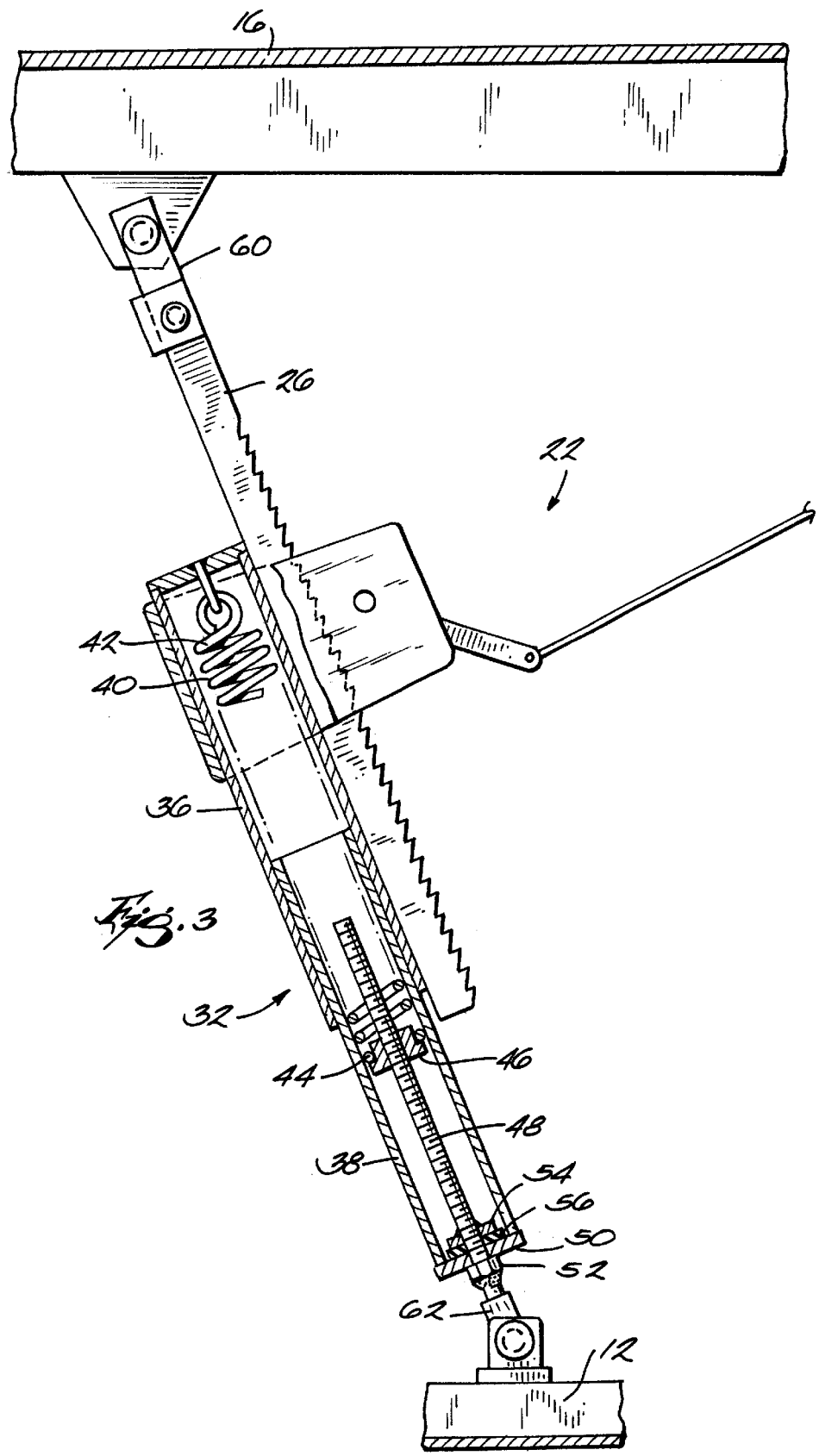
FIG. 3 is an enlarged side section view of the holdown mechanism of FIG. 1.

Referring to FIG. 3, the illustrated spring assembly 32 includes a first spring member in the form of a first housing 36 and a second spring member in the form of a second housing 38 slidably positioned within the first tub 36. An extension spring 40 is at least partially positioned within the first and second housings. A first end 42 of the extension spring 40 is attached to the first housing 36 and a second end 44 of the extension spring 40 is connected to the second housing 38. With this arrangement, movement of the first housing 36 out of the second housing 38 will result in extension of the extension spring 40.

The spring assembly 32 further includes a preload adjustment for adjusting the preload on the extension spring. The illustrated preload adjustment includes a threaded insert 46 secured to the second end 44 of the extension spring 40, and a threaded member in the form of a threaded rod 48 threaded into the threaded insert 46. The threaded rod 48 is rotatably supported within an opening in an end cap 50 of the second housing 38. A nut 52 is threaded onto and welded to the threaded rod 48 on one side of the end cap 50, and a washer 54 is welded to the threaded rod 48 on the other side of the end cap 50. A resilient pad 56 is sandwiched between the washer 54 and the end cap 50. By virtue of this arrangement, the threaded rod 48 can rotate relative to the second housing 38 to adjust the position of the second end 44 of the spring 40 relative to the first end 42 of the spring 40.

The holdown mechanism 22 further includes an upper adapter member 60 for securing the ratchet bar 26 to the ramp 16, and a lower adapter member 62 for securing the spring assembly 32 to the support structure 12. Referring to FIGS. 4–6, the end of the illustrated ratchet bar 26 includes a slot that defines two tangs 64. Each tang includes a hole adapted to receive a pin 66. FIGS. 4–6 illustrate three different styles of upper adapter members 60 that can be attached to the illustrated ratchet bar 26. Each of these upper adapter members 60 corresponds with the mounting configuration for a different style of dockleveler. As can be appreciated, the ratchet bar 26 can accommodate many different upper adapter members 60, and each upper adapter member 60 can be easily installed without the need for cutting or welding.

FIGS. 7–8 illustrate the end of the threaded rod 48 and two different lower adapter members 62 that can be threaded onto the threaded rod 48. Each of these lower adapter members 62 is designed to facilitate attachment of the spring assembly 32 to a different style of dockleveler. It can be appreciated that the illustrated lower adapter members 62 can be easily installed onto the holdown mechanism 22 without the need for cutting or welding.

The illustrated holdown mechanism 22, along with the appropriate adapter members, is designed to fit a variety of different docklevelers. In this regard, this holdown mechanism 22 is particularly useful as a replacement part for a worn out holdown mechanism. More specifically, an entity in charge of repairing docklevelers would only need to stock a single holdown mechanism with various adapter members in order to repair many different styles of docklevelers. The holdown mechanism 22 would be manufactured and sent to the installer, and the installer would select the appropriate adapter members based on the type of dockleveler into which the holdown mechanism will be installed. The adapter members would then be connected to the holdown mechanism, and the holdown mechanism would then be installed into the dockleveler.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A dockleveler comprising:
   a support structure;
   a ramp connected to said support structure and movable between a raised position and a lowered position;
   a upward biasing mechanism connected to the ramp; and
   a holdown mechanism connected between said ramp and said supporting structure, said holdown mechanism including a spring assembly having an extension spring that increases in length as said ramp moves toward the raised position.

2. A dockleveler as claimed in claim 1, wherein said spring assembly further includes:
   a first spring member attached to a first end of said extension spring; and
   a second spring member movable relative to said first spring member and attached to a second end of said extension spring, such that movement of said second spring member away from said first spring member causes said extension spring to increase in length.

3. A dockleveler as claimed in claim 2, wherein said first spring member comprises a hollow member in which at least a portion of said extension spring is positioned.

4. A dockleveler as claimed in claim 1, wherein said spring assembly includes a preload adjustment.

5. A dockleveler as claimed in claim 4, wherein said preload adjustment comprises a threaded insert secured to said extension spring and a threaded member in threaded engagement with said threaded insert, wherein rotation of said threaded member causes in change in length of said extension spring.

6. A dockleveler comprising:

a support structure;

a ramp connected to said support structure and movable between a raised position and a lowered position;

a upward biasing mechanism connected to the ramp; and a holdown mechanism connected between said ramp and said support structure, said holdown mechanism including a spring assembly having:

a spring positioned within both a first hollow member and a second hollow member;

said second hollow member positioned at least partially within said first hollow member and movable relative to said first hollow member; and wherein said spring is positioned to bias the first and second hollow members toward each other.

7. A dockleveler as claimed in claim 6, wherein a first end of said spring is connected to said first hollow member and a second end of said spring is connected to said second hollow member, and wherein said spring is under tension.

8. A dockleveler as claimed in claim 6, wherein said first hollow member comprises a first housing and said second hollow member comprises a second housing slidably inserted into said first housing.

9. A dockleveler as claimed in claim 6, wherein said holdown mechanism further includes a threaded member rotatably secured to said second hollow member, said threaded member being threadedly connected to one end of said spring to facilitate adjustment of a preload force on said spring.

* * * * *